(12) United States Patent
Schrader (10) Patent No.: US 6,950,227 B2
(45) Date of Patent: Sep. 27, 2005

(54) ELECTRICALLY CONTROLLED VARIABLE THICKNESS PLATE

(75) Inventor: Martin Schrader, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/476,821

(22) PCT Filed: Apr. 12, 2002

(86) PCT No.: PCT/FI02/00307
§ 371 (c)(1),
(2), (4) Date: May 4, 2004

(87) PCT Pub. No.: WO02/091059
PCT Pub. Date: Nov. 14, 2002

(65) Prior Publication Data
US 2004/0184138 A1 Sep. 23, 2004

(30) Foreign Application Priority Data
May 3, 2001 (FI) .............................. 20010916

(51) Int. Cl.⁷ ............................ G02F 1/29; G02B 26/00
(52) U.S. Cl. ........................ 359/320; 359/290; 359/291
(58) Field of Search ................................ 359/320, 290, 359/291, 292, 293, 321, 254, 295

(56) References Cited

U.S. PATENT DOCUMENTS

| | | | |
|---|---|---|---|
| 4,626,920 A | 12/1986 | Glenn | 358/234 |
| 5,311,360 A | 5/1994 | Bloom et al. | 359/572 |
| 5,867,297 A | 2/1999 | Kiang et al. | 359/198 |
| 5,937,115 A | 8/1999 | Domash | 385/16 |
| 6,130,770 A | * 10/2000 | Bloom | 359/224 |
| 6,822,797 B1 | * 11/2004 | Carlisle et al. | 359/572 |
| 2004/0109234 A1 | * 6/2004 | Levola | 359/566 |
| 2004/0207891 A1 | * 10/2004 | Suzuki | 359/1 |

FOREIGN PATENT DOCUMENTS

| | | |
|---|---|---|
| GB | 2237443 | 5/1991 |
| WO | WO 98/30927 | 7/1998 |
| WO | WO 01/37627 A2 | 5/2001 |

OTHER PUBLICATIONS

"The Grating Light Valve: revolutionizing display technology", D.M. Bloom, Silicon Light Machines, 12 page document.

"Physics of Reliefography", Y.P. Guscho, M: Nauka, Gen ed. Phys–Math.Lit., 1992, English translation of chapter 7, also enclosed with the English translation of the Russian language title and copyright pages.

* cited by examiner

Primary Examiner—Ricky L. Mack
Assistant Examiner—Brandi Thomas (57) ABSTRACT

The invention refers to electrically controlled optical switching devices which are based on the use of a layer of dielectric and transparent viscoelastic material (G) located between transparent first (ES1) and transparent second (ES2) electrode structures. According to the invention, the first (ES1) and second (ES2) electrode structures are arranged in a manner that the thickness of the layer of the viscoelastic material (G) can be electrically altered maintaining the thickness of said layer substantially equal. This makes it possible to realize a generic, electrically controlled variable thickness plate (30). The generic variable thickness plate (30) can be further used to create optical switching devices based on a Fabry Perot Interferometer or a Mach-Zehnder Interferometer.

16 Claims, 5 Drawing Sheets

ELECTRICALLY CONTROLLED VARIABLE THICKNESS PLATE

BACKGROUND OF THE INVENTION

1. Technical Field

The present invention relates to an electrically switchable optical device operating in transmission for manipulating an incident light wave or light waves passing through the device. The invention also relates to a method for forming electrically switchable optical devices for forming such an optical switching device.

2. Discussion of Related Art

Optical signals in different forms are today increasingly utilized in many different types of devices and applications. In order to take full advantage of systems including optical signals or beams, it must be possible to direct the optical signal or beam coming in on a guided optical conduit, or on some other type of optical system in a desired electrically controlled manner to another optical conduit or to another optical system. The aforementioned optical conduit can be, for example, an optical fiber or other type of optical waveguide. There exists a wide variety of optical systems, which work under fast changing operational conditions, and thus require capability to perform optical functions in an efficient and electrically controlled manner.

Especially the recent rapid development of optical telecommunication and optical data processing systems creates increasing needs for versatile electrically switchable optical devices.

In addition to the act of simply switching the optical signal/beam on or off, the term "optical switching" above and hereinbelow also refers to more complex optical functions, i.e. transformations of the optical signal/beam and/or its path. These include, for example, dividing, redirecting or modulating the amplitude or phase of the optical signal/beam in a desired manner.

In the following, some prior art solutions for electrically controlled optical switching are shortly discussed. However, methods which are based on first converting optical signals into electrical signals for switching and then reconverting said electrical signals back into optical signals for outputting are not included in the following discussion as they are not relevant to the present invention.

A conventional method for electrically controlled optical switching is to mechanically move the optical components, for example mirrors, beamsplitters or beam attenuators in order to affect the propagation of the optical signal/beam. Said mechanical movements can be realized using various kinds of electrical actuators. However, such optical components together with the required electrical actuators cannot be easily made very compact in size and they are also rather difficult and expensive to manufacture, especially as mass-produced articles.

Silicon-surfacemicromachining is a recent technology for fabricating miniature or microscopic devices. This technology has also been used for manufacturing optical micro-electromechanical systems (optical MEMS).

U.S. Pat. No. 5,867,297 discloses an oscillatory optical MEMS device including a micromirror for deflecting light in a predetermined manner. Small physical sizes and masses of these micromachined silicon "machine parts" make them more robust and capable of faster operation than conventional macroscopic mechanical devices.

Grating Light Valve™ devices by Silicon Light Machines, USA represent another type of optical MEMS devices. U.S. Pat. No. 5,311,360 discloses a light modulator structure, which consists of parallel rows of reflective ribbons. Alternative rows of ribbons can be pulled down by electrostatic attraction forces a distance corresponding to approximately one-quarter wavelength to create an electrically controlled grating like structure, which can be used to diffractively modulate the incident light wave. The electrical switching of the ribbons can be realized by integrating bottom electrodes below the ribbons, and by applying different voltages to the ribbons and said bottom electrodes to create the required electrostatic forces. U.S. Pat. No. 6,130,770 discloses another type of solution, where instead of using physical electrical connections to charge the predetermined ribbons of the light modulator structure, selected ribbons are electrically charged with an electron gun.

In principle, silicon optical MEMS technology uses processing steps derived from the integrated circuit (IC) fabrication techniques of photolithography, material deposition and chemical etching to produce the movable mechanical structures on a silicon chip. The aforementioned manufacturing process is, however, fairly difficult and thus expensive. Further, the optical MEMS devices operate mainly only in reflection and thus the capabilities of such devices of more complex transformations of the optical signal/beam and/or its path are limited. Material fatigue may also become significant in certain applications.

Birefringence, also known as double refraction, is a property which can be found in some transparent materials, for example in crystals. Such optical materials have two different indices of refraction in different directions. This can be used to create Pockels effect, an electro-optical effect in which the application of an electric field produces a birefringence which is proportional to the electric field applied to the material. The Pockels effect is well known in the art and it is commonly used to create, for example, fast optical shutters. However, because the use of birefringence requires use of polarized light, this severely limits its use as a general method in realizing optical switching devices.

U.S. Pat. No. 5,937,115 describes switchable optical component structures based on a holographic polymer dispersed liquid crystal. These are electronically controlled Bragg grating structures which allow to electronically switch on and off the diffractive effect of the transparent grating structures, which have been optically recorded or otherwise generated in the material. These electronically switchable Bragg grating (ESBG) devices can be used for various filtering or lensing applications. The major drawback of the ESBG technology is the complex manufacturing process required. Environmental concerns and hazards generally related to liquid crystal materials apply also to the ESBG devices.

U.S. Pat. No. 4,626,920 discloses a semiconductor device, which has an array of spaced charge storage electrodes on semiconductor material (Si) and an elastomer layer disposed on said electrodes. At least one conductive and light reflective layer is disposed over the elastomer layer. When voltages are applied between the charge storage electrodes and the conductive layer, this causes the deformation of the conductive/reflective layer and the elastomer layer from a flat surface to a form having a sinusoidally cyclically varying cross-section. Thus, the reflective front surface of the conductive layer can be utilized as an electrically switchable reflective grating.

GB patent 2,237,443 describes another light modulating device, where a reflective elastomer or viscoelastic layer is utilized for light modulation. In this arrangement an electron gun (cathode ray tube) is used instead of direct electrical connections/electrodes (cf. U.S. Pat. No. 4,626,920) to generate the electrical pattern needed to deform the elastomer layer.

An important aspect in the above described type of systems (U.S. Pat. No. 4,626,920 and GB 2,237,443) is the operation of the conductive/reflective layer or layers which is/are mounted on the deformable elastomer layer. Said conductive/reflective layer or layers must reliably and repeatably provide precise patterns of deformations which correspond to the charge pattern modifying the elastomer layer. This, together with the fact that said devices operate only in reflection, limits the use of such devices due to the limited selection of suitable conductive and reflective materials as well as due to the overall response characteristics (sensitivity to the applied voltages/charges, temporal response characteristics) of the device.

Yury P. Guscho "Physics of Reliofography" (Nauka, 1992, 520 p. in Russian) describes in chapter 7 a number of light modulator structures, in which a transparent viscoelastic layer is electrically deformed to manipulate the light passing through said viscoelastic layer. These devices can be taken to present the closest prior art with respect to the current invention, and they are therefore shortly described below with reference to the appended FIGS. 1a and 1b.

Figure 1A:
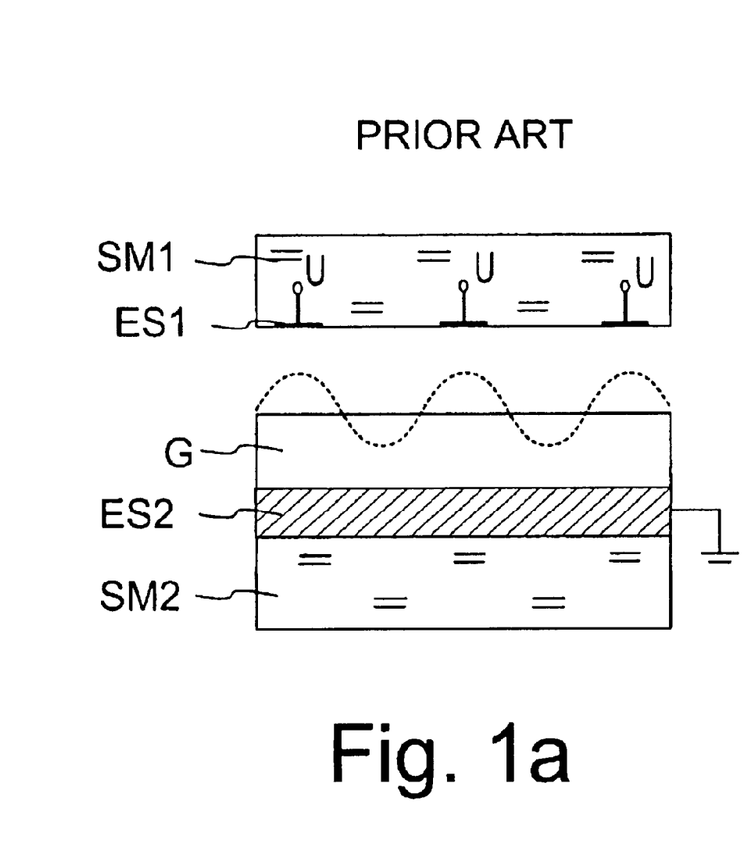
FIGS. 1a, 1b illustrate prior art light modulator structures utilizing an electrically controlled transparent viscoelastic layer to produce sinusoidally varying gratings.
Figure 1B:
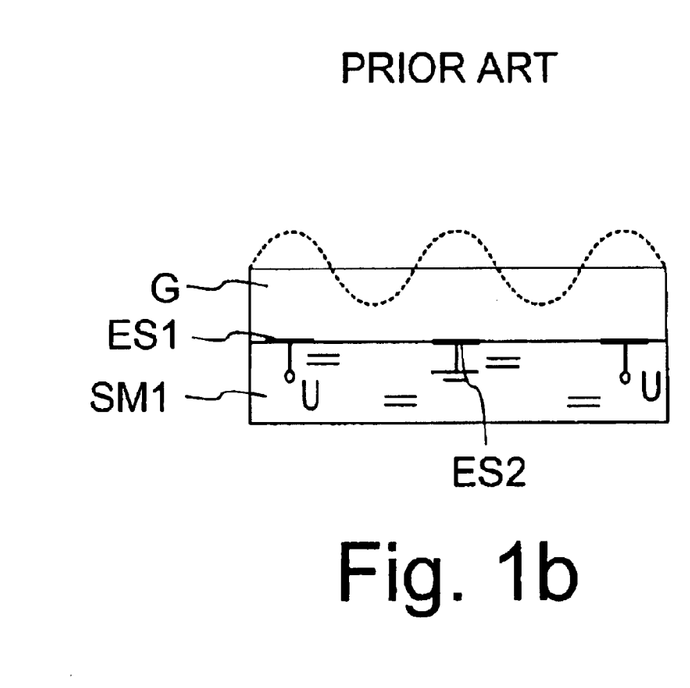

FIGS. 1a and 1b correspond to FIG. 7.1 in chapter 7 of "Physics of Reliofography" and show the two basic schemes of the light modulator structures.

In the first scheme in FIG. 1a, the driving signal (U) for deforming the viscoelastic layer G is applied from the free side of the viscoelastic layer G using driving electrodes ES1, which electrodes ES1 are formed on the lower surface of a top glass substrate SM1. A gap is left between the free surface of the viscoelastic layer G and the lower surface of the top glass substrate SM1, allowing the viscoelastic layer G to deform without contacting the opposite structure. The aforementioned gap can be for example air, gas or vacuum. The electric field deforming the viscoelastic layer G is generated between the driving electrodes ES1 and the conductive substrate electrode ES2.

In the second scheme in FIG. 1b, the viscoelastic layer G is disposed on the driving electrode structure ES1, which in turn is formed on a glass substrate SM1. The electric field deforming the viscoelastic layer G is generated by applying alternating voltages to the neighbouring electrode zones in the driving electrode structure ES1.

In both of the aforementioned schemes, the free surface of the viscoelastic layer G can be coated with a conductive reflecting layer (sputtered metal film).

According to our best understanding, all the light modulator structures presented in the chapter 7 of "Physics of Reliofography" and discussed shortly above are based on the basic idea of deforming the viscoelastic layer into a surface structure having a substantially sinusoidally varying cross-section. This allows to use the viscoelastic layer as an electrically controlled sinusoidal grating in order to modulate the incident light wave.

DISCLOSURE OF INVENTION

The main purpose of the present invention is to produce a novel device for optical switching, which is based on the use of an electrically deformable viscoelastic layer in order to manipulate the light passing through said viscoelastic layer, but which is not based on using the viscoelastic layer as a grating-like structure. This innovation allowing to manipulate the viscoelastic layer in a completely new way significantly broadens the possibilities to use electrically controlled viscoelastic materials for optical switching applications.

According to a first aspect of the present invention, an optical switching device operating in transmission for manipulating an incident light wave or light waves passing through the device comprises at least a first transparent electrode structure comprising one or more electrode zone/s having an effective total area $A_1$ and arranged in a manner that the electrode zone/s is/are capable of receiving voltage or voltages, a second transparent electrode structure comprising one or more separate electrode zone/s having effective total area $A_2$ and arranged in a manner that the electrode zone/s is/are capable of receiving voltage or voltages, and a layer of dielectric and transparent viscoelastic material located between the first and the second electrode structures capable of being deformed in local thickness in response to electric field/s generated by the first and the second electrode structures and the electric field/s passing through the viscoelastic material, wherein the first and the second electrode structures are arranged in a manner that the effective total area $A_1$ of the first electrode structure is substantially larger than the effective total area $A_2$ of the second electrode structure, and within the area corresponding substantially to the projection of said area $A_2$ to the area $A_1$, the thickness of the layer of the viscoelastic material can be electrically altered maintaining the thickness of the layer in different parts of the projection area substantially equal in order to realize an electrically controlled variable thickness plate, so that the variable thickness plate is suitable for altering the optical path length of the transmitted light in order to perform optical switching based on interferometry.

According to a second aspect of the present invention, a method for forming an optical switching device operating in transmission for manipulating an incident light wave or light waves passing through said device, said method comprises at least the steps of forming a first transparent electrode structure comprising one or more electrode zone/s having effective total area $A_1$ and arranged in a manner that said electrode zone/s is/are capable of receiving voltage or voltages, forming a second transparent electrode structure comprising one or more separate electrode zone/s having effective total area $A_2$ and arranged in a manner that the electrode zone/s is/are capable of receiving voltage or voltages, and forming a layer of dielectric and transparent viscoelastic material between the first and the second electrode structures capable of being deformed in local thickness in response to electric field/s generated by the first and the second electrode structures and the electric field/s passing through the viscoelastic material, wherein the first and the second electrode structures are arranged in a manner that the effective total area $A_1$ of the first electrode structure is substantially larger than the effective total area $A_2$ of the second electrode structure, and within the area corresponding substantially to the projection of the area $A_2$ to the area $A_1$, the thickness of the layer of viscoelastic material can be electrically altered maintaining the thickness of the layer in different parts of the projection area substantially equal in order to realize an electrically controlled variable thickness plate, so that the variable thickness plate is suitable for altering the optical path length of the transmitted light in order to perform optical switching based on interferometry.

The invention also relates to a method for forming electrically switchable optical devices. The method according to the invention is primarily characterized in what will be presented in the characterizing part of the independent claim 9.

The basic idea of the invention is to provide a device, in which the transparent viscoelastic layer located between opposite transparent electrode structures can be deformed in such a way that the thickness of said viscoelastic layer can be electrically altered while simultaneously maintaining the substantially flat surface of the viscoelastic layer inside a certain area defined by the electrode structures. Due to the fact that the viscoelastic material has a different index of refraction compared to the medium forming the necessary gap between the viscoelastic layer and at least one of the opposite electrode structures, the light passing through the viscoelastic layer and said gap experiences a different optical path length depending on the thickness of the viscoelastic layer. Therefore, the optical device according to the invention can be used as a generic electrically controlled variable thickness plate, which can be used to alter the phase of the light passing through the device.

In one specific embodiment of the invention, the opposite electrode structures and/or substrate materials supporting said structures in the variable thickness plate device are realized as light reflecting structure/s. This causes the light entering the device to pass through the viscoelastic layer more than once and thus makes it possible to create an electrically controlled Fabry Perot Interferometer.

In another embodiment of the invention, the variable thickness plate device is placed into the optical path of one of the optical arms of a Mach-Zehnder Interferometer. This makes it possible to create an electrically controlled Mach-Zehnder Interferometer type optical switching device. Preferably, and differing from the case of the aforementioned Fabry Perot switch, all the stationary optical surfaces of the variable thickness plate are arranged to have anti-reflection coatings.

The electrically controlled variable thickness plate and the various applications utilizing the same can be used for many types of optical switching purposes. The devices according to the invention can be used, for example, to switch a beam of light with a given wavelength λ on or off, or they can be used as variable intensity filters to adjust the intensity of the transmitted beam. The Mach-Zehnder Interferometer switch makes it possible to switch the optical signal between several targets and/or to create any desired ratio of the optical signals at said targets.

The devices according to the invention are significantly more advantageous than prior art devices in providing much wider possibilities to manufacture electrically controlled optical switching devices. The manufacture of such devices also promises to be relatively easy and economical compared to prior art technologies allowing, for example, the use of a wider variety of substrate materials and simpler manufacturing processes. The manufacture of the devices according to invention do not involve for example the use of environmentally harmful liquid crystal materials, or require deep etching. Further, the optical switching devices according to the invention are independent of polarization.

The preferred embodiments of the invention and their benefits will become more apparent to a person skilled in the art through the description and examples given hereinbelow, and also through the appended claims.

BRIEF DESCRIPTION OF THE DRAWINGS

In the following, the invention will be described in more detail with reference to the appended drawings, in which.

BEST MODE FOR CARRYING OUT THE INVENTION

It is to be understood that the drawings presented hereinbelow are designed solely for purposes of illustration and thus, for example, not for showing the various components of the devices in their correct relative scale and/or shape. For the sake of clarity, the components and details which are not essential in order to explain the spirit of the invention have also been omitted in the drawings.

Figure 2:
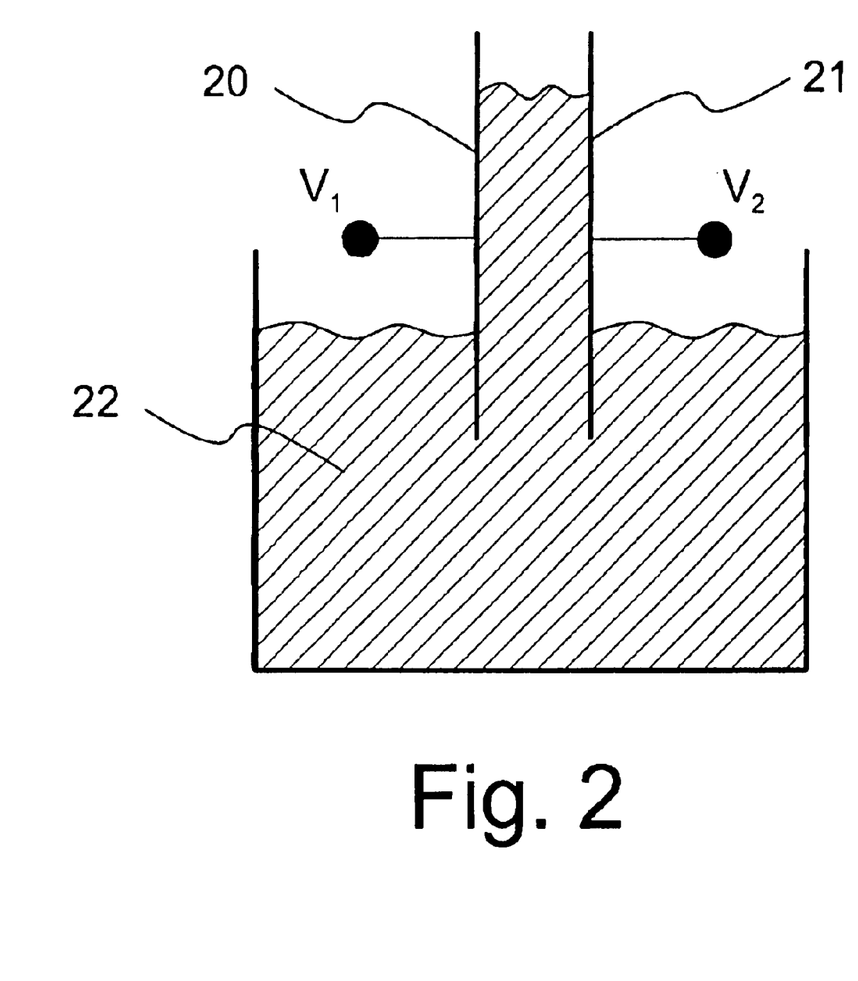
FIG. 2 illustrates the behaviour of dielectric liquid in an electric field between electrode plates of a field capacitor.

FIG. 2 illustrates the general principle of physics, which can be observed with dielectric substances. A dielectric substance can be defined as a substance in which an electric field may be maintained with zero or near zero power dissipation, i.e. the electrical conductivity is zero or near zero. In an electric field, the surface of two dielectrics with different dielectric constants is known to experience a force which is proportional to the square of the electric field strength. In FIG. 2 where an electric field is formed between electrode plates 20 and 21 of a field capacitor by applying suitable voltages $V_1$ and $V_2$ on said electrodes, dielectric liquid 22 is drawn between the electrode plates because of the aforementioned force effect.

Figure 3:
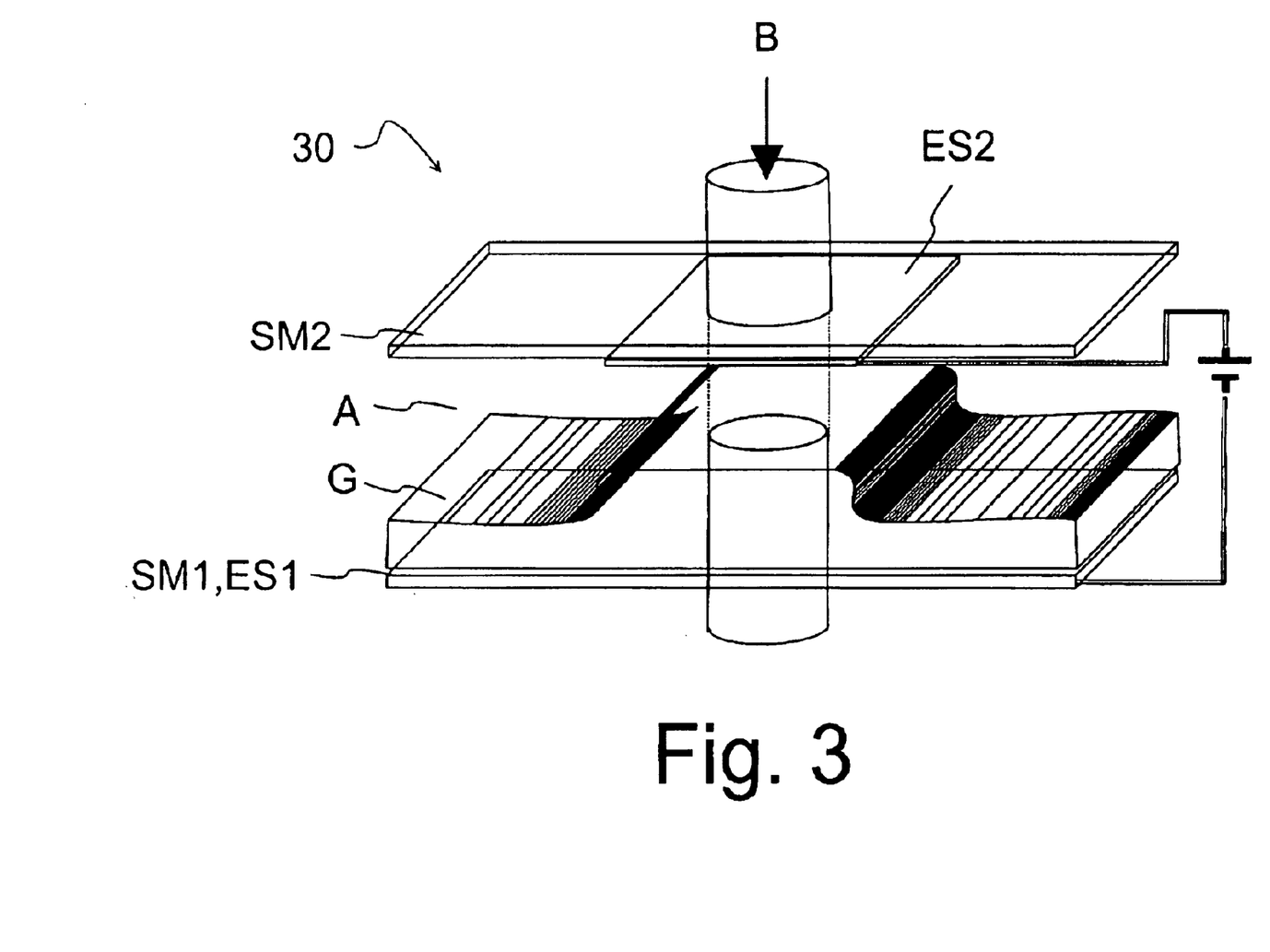
FIG. 3 illustrates schematically a generic variable thickness plate according to the invention.

FIG. 3 illustrates schematically generic variable thickness plate 30 according to the invention. A layer of dielectric and viscoelastic transparent material G is applied onto a first transparent electrode structure ES1, which in turn is formed on a first transparent substrate material SM1. Said first electrode structure ES1 comprises a single electrode zone having an effective total area $A_1$ and covering substantially the whole area ($\approx A_1$) of the first substrate material SM1. A second transparent electrode structure ES2 having an effective total area $A_2$ is formed on a second transparent substrate material SM2. Said second electrode structure ES2 is located at a distance from the viscoelastic layer G so that the viscoelastic layer G is located between the first ES1 and the second ES2 electrode structures. The second electrode structure ES2 also comprises a single electrode zone, but instead of covering the total area of the second substrate material SM2 (and that of the viscoelastic material G), the second electrode structure/zone ES2 is arranged to cover only a part of said area. This makes it possible to change the thickness of the viscoelastic layer G below the second electrode structure/zone ES2 as a function of the voltage applied between first and second electrode structures in such a manner that the viscoelastic layer G maintains a substantially flat surface and therefore an even thickness below the second electrode structure/zone ES2. In order to allow the viscoelastic layer G to deform without contacting the opposite electrode structure ES2, a gap A is left between the surface of the viscoelastic layer G and said electrode structure ES2.

Due to the fact that the viscoelastic material G has a different index of refraction compared to the medium forming the aforementioned gap A, the light passing through the variable thickness plate device 30 within the area ($\approx A_2$) defined by the projection of the second electrode structure ES2 onto the first electrode structure ES1 experiences a different optical path length depending on the thickness of the viscoelastic layer G.

A suitable transparent viscoelastic material G includes, for example, silicone gel, oil, various polymer materials or other viscous substances that have a tendency to deform when placed in a presence of an electric field, and said materials relax towards their original form or shape after the aforementioned effect ceases.

The gap A between the viscoelastic layer G and at least one of the opposite electrode structures ES1,ES2 can be for example air, gas or vacuum.

In order not to significantly change the density of the viscoelastic material G when changing the thickness of the layer of said material between the first ES1 and the second ES2 electrode structures, the area of the projection of the smaller electrode structure (ES2 with effective total area $A_2$) to the larger electrode structure (ES1 with effective total area $A_1$) is arranged to be smaller than the area of the free surface of the viscoelastic layer G. In other words, in the presence of an electric field between said electrodes, the viscoelastic layer G outside the aforementioned projection area becomes thinner when the amount of viscoelastic material in that area decreases, and respectively, within said projection area ($\approx A_2$), the viscoelastic layer G grows thicker when the amount of viscoelastic material builds up.

The transparent electrode structure ES1 and/or ES2 is preferably made of indium tin oxide (ITO), as is known in the art, and the transparent substrates SM1,SM2 supporting said electrode structures are preferably made of glass. Other methods for creating substantially transparent electrode structures on any substantially transparent substrate material can also be employed without departing from the scope of the present invention.

Instead of being fully transparent, it is possible that the substrate materials SM1,SM2 and/or the electrode structures ES1,ES2 on either side of the viscoelastic layer G may be arranged to provide spectral filtering of the transmitted light.

It is obvious that the light B incident to the variable thickness plate 30 can enter the device from either side, for example, through the first substrate material SM1 or through the second substrate material SM2.

Hereinbelow, some specific examples of different types of interferometric optical switching devices utilizing the variable thickness plate 30 according to the invention will be presented. It should be understood that these examples should not be interpreted as a definition of the limits of the invention. Various other kinds of optical structures can also be realized according to the invention and within the limits of the appended claims practising the normal design capabilities of a person skilled in the art.

Fabry Perot Interferometer

Fabry Perot Interferometer (FPI) is a well-known device in the art. In principle and in its simplest form, the device comprises two planar, parallel, highly reflecting surfaces separated by a distance d so that these reflecting surfaces (mirrors) form a cavity between them. When an FPI cavity is illuminated at normal incidence through either of said surfaces (end mirrors) with light having a wavelength of $\lambda$, the FPI passes the light through only if the optical path difference (OPD) of a directly transmitted beam (with effective pathlength d) and a beam reflected back and forward between the aforementioned reflecting surfaces (with effective pathlength 2d, 4d, 6d . . . ) equals $m\lambda$, where m is an integer. In other words, in order for the light to pass through the FPI, said directly transmitted beam and said reflected beam need to be subjected to constructive interference. Slight detuning of the OPD will result in a suppression of the light transmitted through the FPI cavity by a factor which is determined by the so-called finesse of the FPI cavity. The aforementioned effect is well-known in the art and utilized in different types of spectroscopic applications.

Figure 4:
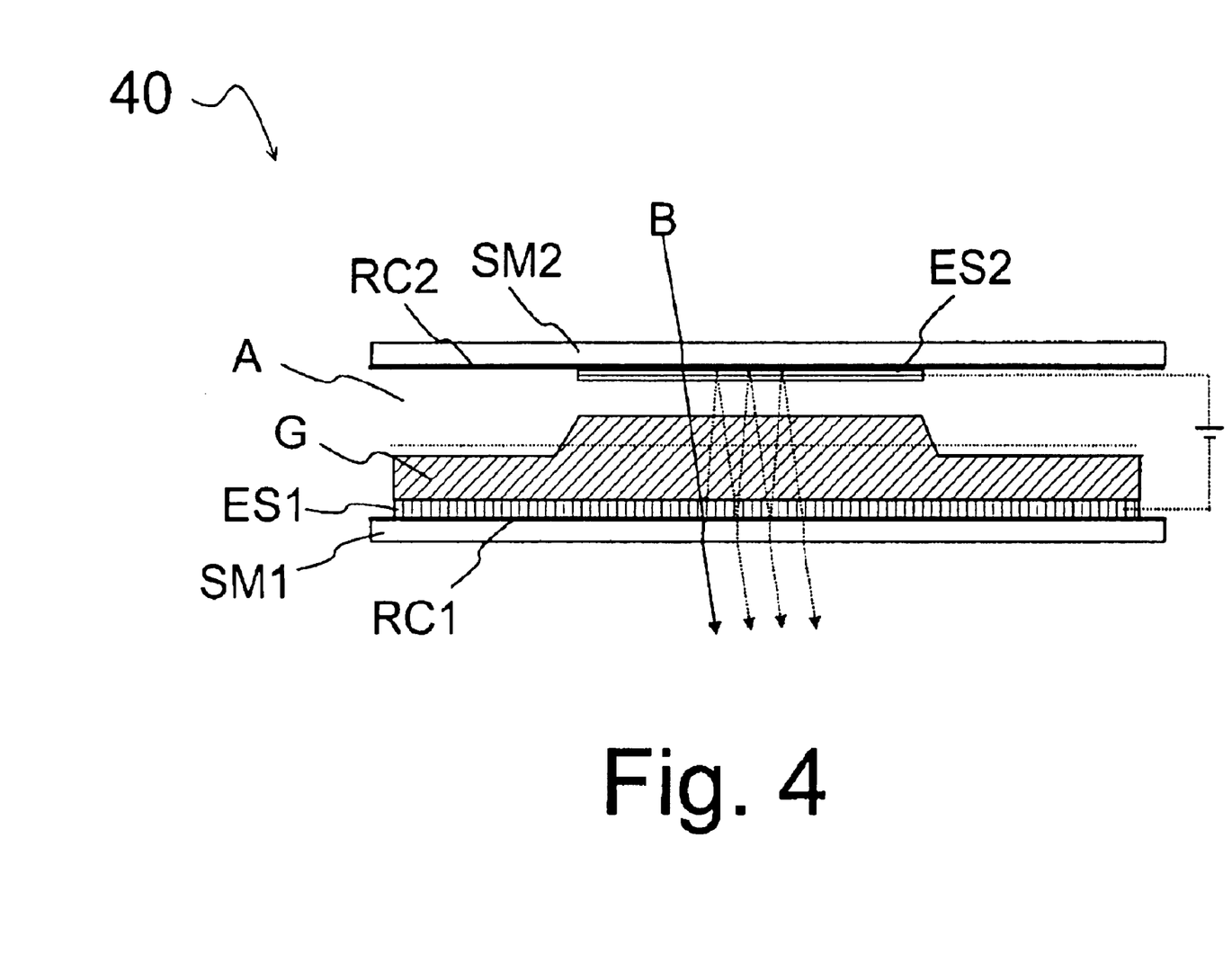
FIG. 4 illustrates schematically a Fabry Perot Interferometer according to the invention.

By using the variable thickness plate 30 according to the invention and illustrated in FIG. 3, one can realize an FPI cavity which allows to control the OPD of the cavity by simply varying the voltage across the first ES1 and second ES2 electrode structures and thus changing the thickness of the viscoelastic layer G. One example of a Fabry Perot cavity 40 based on this principle is schematically illustrated in FIG. 4.

In order to provide the reflecting surfaces for the FPI cavity, the first SM1 and second SM2 substrate materials and/or the first ES1 and second ES2 electrode structures are arranged to be reflecting. One possibility is to coat the surfaces of the first SM1 and second SM2 substrate materials with highly reflective optical coatings RC1 and RC2, respectively. Methods for manufacturing such coatings on transparent materials are well known in the art.

The FPI cavity can also be formed by locating the variable thickness plate structure 30 between two external mirrors.

A Fabry Perot cavity 40, which is realized in the aforementioned manner, can be used to switch a beam of light with a given wavelength $\lambda$ on or off (OPD is detuned significantly off), or it can be used as a variable intensity filter to adjust the intensity of the transmitted beam (OPD is detuned only slightly off). The Fabry Perot cavity 40 can be used further for wavelength filtering if it is illuminated with light B having discrete wavelengths, for example certain laser generated wavelength bands, or even more continuous spectrum. In this case, the Fabry Perot cavity 40 allows transmission only for those wavelengths which fulfil the aforementioned OPD-criterion.

Mach-Zehnder Interferometer-type Switch

The variable thickness plate 30 according to the invention and illustrated in FIG. 3 can also be utilized in other types of interferometric devices than the aforementioned Fabry Perot cavity 40.

Figure 5:
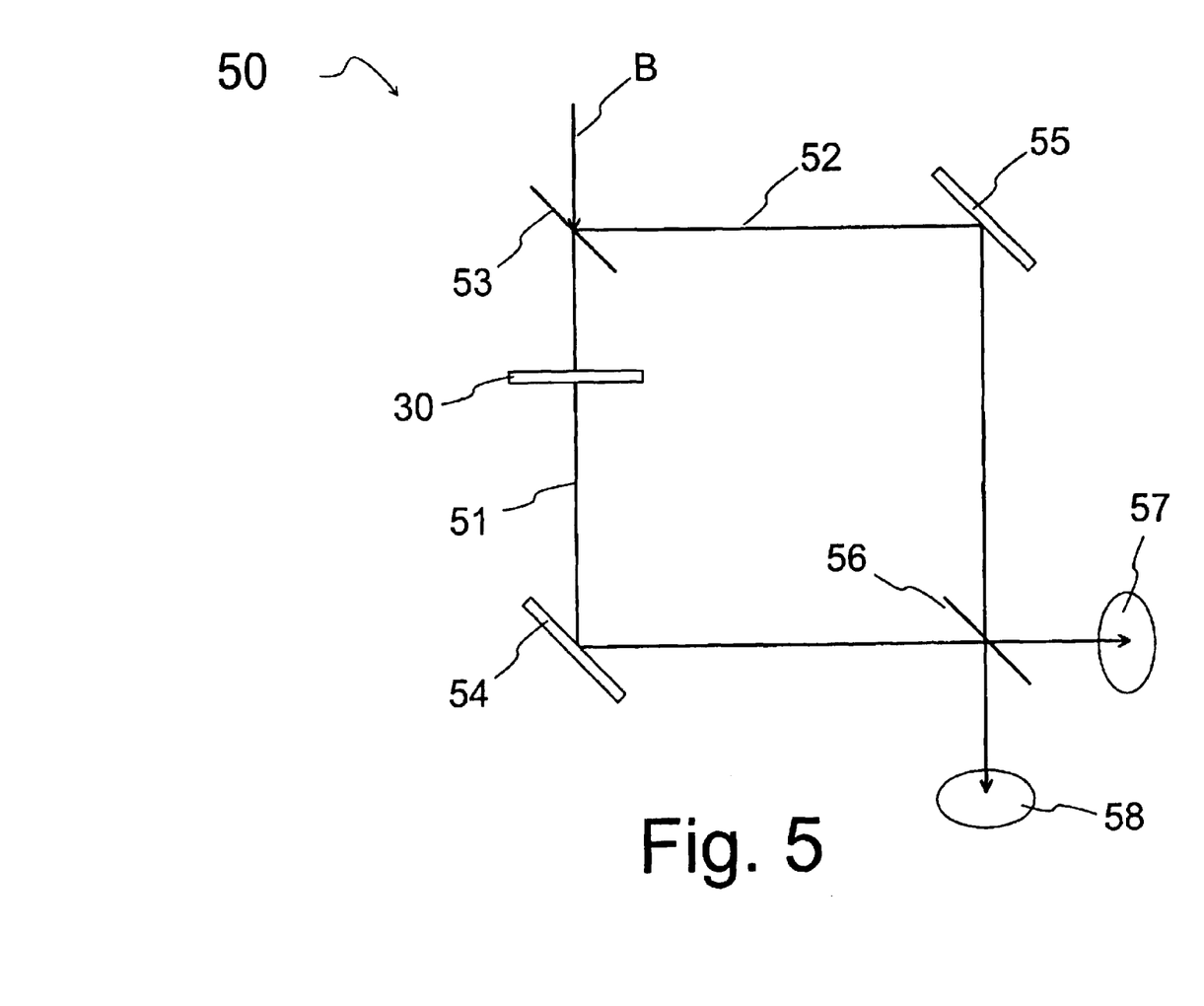
FIG. 5 illustrates schematically a Mach-Zehnder Interferometer type switch according to the invention.

FIG. 5 illustrates an optical switch 50 based on a Mach-Zehnder Interferometer (MZI). By using a first beamsplitting means 53, a light beam B entering the MZI is divided into separate first 51 and second 52 beams, which beams are directed into corresponding separate optical arms of the MZI. Mirrors 54 and 55 are arranged to direct the first 51 and second 52 beams, respectively, towards a second beamsplitting means 56. In the second beamsplitting 56 means, the first beam 51 is further divided into two beams: one directed towards a target 57 and the other one towards a target 58. Correspondingly, the second beam 52 is divided by the second beamsplitting means 56 into two beams: one directed towards the target 57 and the other one towards the target 58.

Depending on the OPD undergone by the first 51 and the second 52 beams travelling through the separate arms of the MZI and in cases where said OPD equals $m\lambda/2$ (m is an integer), there can be constructive interference of said beams taking place at the target 57 (light transmitted) and destructive interference at the target 58 (no light transmitted), or vice versa. In case the OPD deviates from $m\lambda/2$, some intermediate light intensity will be detected at both of the targets 57 and 58.

In prior art interferometric devices utilizing an MZI, the variable phase delay, i.e. the alteration of the OPD experienced by the the first 51 and the second 52 beams has been typically realized by moving one of the mirrors 54,55 included in the two optical arms of the interferometer setup.

In a Mach-Zehnder switch 50 according to the invention, the alteration of the OPD is realized by introducing the variable thickness plate 30 (FIG. 3) in one of the two arms of the MZI device. In FIG. 5, the variable thickness plate 30 is illustrated as being introduced into the first beam 51 after the first beamsplitting means 53. Alternatively, the variable thickness plate 30 could be introduced in any location in the first 51 or in the second 52 beam between the first 53 and the second 56 beamsplitting means. Preferably, and deviating from the case of the aforementioned Fabry Perot cavity 40, all the stationary optical surfaces of the variable thickness plate 40 are arranged to have anti-reflection coatings.

The Mach-Zehnder switch 50 according to the invention allows the switching of the signal between targets 57 and 58 and/or the formation of any desired ratio of the signals at said targets. This can be achieved simply by applying a suitable voltage on the first ES1 and the second ES2 electrode structures of the variable thickness plate 30 (FIG. 3). For a person skilled in the art, it is also obvious that in a manner similar to the aforementioned Fabry Perot switch 40, the Mach-Zehnder switch 50 can also be used for wavelength filtering purposes. Targets 57 and 58 can be, for example, detectors or entrance apertures of optical conduits or other optical systems.

While the invention has been shown and described above with respect to selected types of optical switching devices, it should be understood that these devices are only examples and that a person skilled in the art could construct other optical switching devices utilizing techniques other than those specifically disclosed herein while still remaining within the spirit and scope of the present invention. It should therefore be understood that various omissions and substitutions and changes in the form and detail of the switching devices illustrated, as well as in the operation of the same, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to restrict the invention only in the manner indicated by the scope of the claims appended hereto.

For example, the embodiments of the invention can be extended to devices where either one or both of the first ES1 and/or second ES2 electrode structures contain more than one electrode zone in order to ensure an even thickness of the deformed viscoelastic layer G also in the periphery of the projection area between the first ES1 and second ES2 electrodes. In said periphery, the thickness of the viscoelastic layer G tends to differ from the thickness in the center of the projection area because of uneven electric field strength, if only single electrode zone first ES1 and second ES2 electrode structures are used.

In case of an electrode structure (ES1 and/or ES2) comprising more than one electrode zone, the expression "effective total area" of the electrode structure used above and in the appended claims refers more specifically to the area defined by the outside dimensions of the electrode structure than simply to the integral area of the individual electrode zones.

It will be evident for a person skilled in the art that the operation of the optical devices according to the invention relies on some applications on optical interference, and thus requires a certain degree of coherence and/or collimation of the optical signal/beam that is being processed.

What is claimed is:

1. An optical switching device operating in transmission for manipulating an incident light wave or light waves (B) passing through said device, comprising at least a first transparent electrode structure (ES1) comprising one or more electrode zone/s having an effective total area $A_1$ and arranged in a manner that said electrode zone/s is/are capable of receiving voltage or voltages, a second transparent electrode structure (ES2) comprising one or more separate electrode zone/s having effective total area $A_2$ and arranged in a manner that said electrode zone/s is/are capable of receiving voltage or voltages, and a layer of dielectric and transparent viscoelastic material (G) located between said first (ES1) and said second (ES2) electrode structures capable of being deformed in local thickness in response to electric field/s generated by said first (ES1) and said second (ES2) electrode structures and said electric field/s passing through said viscoelastic material (G), wherein said first (ES1) and said second (ES2) electrode structures are arranged in a manner that the effective total area $A_1$ of said first electrode structure (ES1) is substantially larger than the effective total area $A_2$ of said second electrode structure (ES2), and within the area corresponding substantially to the projection of said area $A_2$ to said area $A_1$, the thickness of the layer of the viscoelastic material (G) can be electrically altered maintaining the thickness of said layer in different parts of said projection area substantially equal in order to realize an electrically controlled variable thickness plate (30), so that said variable thickness plate (30) is suitable for altering the optical path length of the transmitted light (B) in order to perform optical switching based on interferometry.

2. The device according to claim 1 wherein said first (ES1) and second (ES2) electrode structures each comprises a single, rectangular electrode zone and said electrode zones are arranged with planes thereof parallel to each other.

3. The device according to claim 1, wherein a substrate material (SM1) supporting said first electrode structure (ES1) and/or a substrate material (SM2) supporting said second electrode structure (ES2) is/are arranged to provide spectral filtering of the transmitted light (B).

4. The device according to claim 1, wherein said first (ES1) and/or second (ES2) electrode structure/s is/are indium tin oxide (ITO) structure/s.

5. The device according to claim 1, wherein stationary optical surfaces (ES1, ES2, SM1, SM2) of said device (30) are arranged to have anti-reflection coatings.

6. The device according to claim 1, wherein said device (30) is located between two external highly reflecting mirrors in order to perform an interferometric optical cavity.

7. The device according to claim 1, wherein substrate materials (SM1, SM2) supporting said first (ES1) and said second (ES2) electrode structures, and/or said first (ES1) and said second (ES2) electrode structures are arranged to be light reflecting (RC1, RC2) to form an interferometric optical cavity in order to realize an electrically controlled Fabry Perot Interferometer (40).

8. The device according to claim 1, wherein said device (30) is placed into an optical path of at least one optical arm of plural optical arms (51, 52) of a Mach-Zehnder Interferometer in order to realize an electrically controlled Mach-Zehnder Interferometer type switch (50).

9. A method for forming an optical switching device operating in transmission for manipulating an incident light wave or light waves (B) passing through said device, said method comprising at least the steps of forming a first transparent electrode structure (ES1) comprising one or more electrode zone/s having effective total area $A_1$ and arranged in a manner that said electrode zone/s is/are capable of receiving voltage or voltages, forming a second transparent electrode structure (ES2) comprising one or more separate electrode zone/s having effective total area $A_2$ and arranged in a manner that said electrode zone/s is/are capable of receiving voltage or voltages, and forming a layer of dielectric and transparent viscoelastic material (G) between said first (ES1) and said second (ES2) electrode structures capable of being deformed in local thickness in response to electric field/s generated by said first (ES1) and said second (ES2) electrode structures and said electric field/s passing through said viscoelastic material (G), wherein said first (ES1) and said second (ES2) electrode structures are arranged in a manner that the effective total area $A_1$ of the first electrode structure (ES1) is substantially larger than the effective total area $A_2$ of said second electrode structure (ES2), and within the area corresponding substantially to the projection of said area $A_2$ to said area $A_1$, the thickness of the layer of viscoelastic material (G) can be electrically altered maintaining the thickness of said layer in different parts of said projection area substantially equal in order to realize an electrically controlled variable thickness plate (30), so that said variable thickness plate (30) is suitable for altering the optical path length of the transmitted light (B) in order to perform optical switching based on interferometry.

10. The method according to claim 9, wherein said first (ES1) and second (ES2) electrode structures each comprises a single, rectangular electrode zone and said electrode zones are arranged with their planes being parallel to each other.

11. The method according to claim 9, wherein a substrate material (SM1) supporting said first electrode structure (ES1) and/or a substrate material (SM2) supporting said second electrode structure (ES2) is/are arranged to provide spectral filtering of the transmitted light wave (B).

12. The method according to claim 9, wherein said first (ES1) and/or second (ES2) electrode structure/s is/are formed as indium tin oxide (ITO) structure/s.

13. The method according to claim 9, wherein stationary optical surfaces (ES1, ES2, SM1, SM2) of said device (30) are arranged to have anti-reflection coatings.

14. The method according to claim 9, wherein said device (30) is located between two external highly reflecting mirrors in order to form an interferometric optical cavity.

15. the method according to claim 9, wherein substrate materials (SM1, SM2) supporting said first (ES1) and said second (ES2) electrode structures, and/or said first (ES1) and said second (ES2) electrode structures are arranged to be light reflecting (RC1, RC2) to form an interferometric optical cavity in order to realize an electrically controlled Fabry Perot Interferometer (40).

16. The method according to claim 9, wherein said device (30) is placed into an optical path of at least one optical arm of plural optical arms (51, 52) of a Mach-Zehnder Interferometer in order to realize an electrically controlled Mach-Zehnder Interferometer type switch (50).

\* \* \* \* \*

UNITED STATES PATENT AND TRADEMARK OFFICE
CERTIFICATE OF CORRECTION

PATENT NO.    : 6,950,227 B2
DATED         : September 27, 2005
INVENTOR(S)   : Martin Schrader It is certified that error appears in the above-identified patent and that said Letters Patent is hereby corrected as shown below:

Column 1,
Line 1, should read the following:
  -- CROSS REFERENCE TO RELATED APPLICATIONS

This application is the U.S. National Stage of International Application PCT/FI02/00307 filed April 12, 2002, and applicant claims priority from Finnish Application No. 20010916 filed May 3, 2001. --.

Column 10,
Line 57, "perform" should be -- form --.

Column 12,
Line 12, "wave" should be deleted.
Line 22, "the" should be -- The --.

Signed and Sealed this

Seventh Day of February, 2006

JON W. DUDAS
*Director of the United States Patent and Trademark Office*